(12) United States Patent
Baruch et al.

(10) Patent No.: US 6,182,181 B1
(45) Date of Patent: Jan. 30, 2001

(54) COMPUTER SYSTEM WITH INTERFACE AND METHOD

(75) Inventors: Ezra Baruch, Karkur; Yaron Gold, Kadima; Dan M. Bruck, Beer-Yaacov, all of (IL)

(73) Assignee: Motorola, Inc., Schaumburg, IL (US)

( * ) Notice: Under 35 U.S.C. 154(b), the term of this patent shall be extended for 0 days.

(21) Appl. No.: 08/999,178

(22) Filed: Dec. 29, 1997

(51) Int. Cl.[7] .................................................. G06F 13/00
(52) U.S. Cl. .............................................. 710/129; 710/54
(58) Field of Search .............................. 710/54, 129, 136

(56) References Cited

U.S. PATENT DOCUMENTS

| | | |
|---|---|---|
| 4,816,996 | 3/1989 | Hill et al. . |
| 4,958,277 | 9/1990 | Hill et al. . |
| 5,379,379 | 1/1995 | Becker et al. .................... 395/250 |
| 5,386,514 * | 1/1995 | Lary et al. .............................. 710/54 |
| 5,555,396 * | 9/1996 | Alferness et al. .................. 711/147 |
| 5,805,922 | 9/1998 | Sim et al. ............................. 395/825 |

OTHER PUBLICATIONS

"Wueued Serial Module (QSM) Reference Manual" by Motorola, Inc. 1991, order number QSMRM/AD.

* cited by examiner

Primary Examiner—Ayaz R. Sheikh
Assistant Examiner—David A. Wiley

(57) ABSTRACT

An interface (101) in a computer system has an port (150) which is coupled to a memory via a first bi-directional data path (104) and coupled to a peripheral device via a communication path (106). The interface (101) has a controller (170) with an enable portion (176) and a pointer register (160). The pointer register (160) provides a movable pointer (165) to memory entries of data queues. The enable portion (176) continuously receives control signals from the memory (130) and sends enable signals to a port (150). A queue of memory entries is transmitted through the first path (104), the port (150) and the second path (106) or vice versa as long as control signals stored in the queue itself allow a transmission.

10 Claims, 10 Drawing Sheets

COMPUTER SYSTEM WITH INTERFACE AND METHOD

RELATED APPLICATION

The present application is related to the commonly assigned United States application "Computer system with trigger controlled interface and method" by Ezra Baruch et. al., having serial number 08/999,274.

FIELD OF THE INVENTION

The present invention generally relates to computer systems and, more particularly to interfaces for data communication used in such systems. The present invention also relates to a method for operating such systems.

BACKGROUND OF THE INVENTION

Computer systems (e.g., integrated microcomputers) comprise processors (e.g., a central processing unit CPU, memory units (e.g., a random access memory RAM), busses, and other components. Interfaces exchange data and control information between these components and peripheral devices (e.g., displays, printers, buzzers). For example, the processor writes data to the memory and the interface sends this data to the peripheral device, or vice versa. To save processor resources, it is convenient to control the interfaces partly or completely independent from the processor. The interface transfers data from the memory or to the memory in so-called queues. A queue is usually a set of data entries in the memory which is identified by a start address and an end address. Usually, the processor tells the interface these addresses through registers. But communication via registers is inconvenient, because of the use of software and processor resources. Other disadvantages of prior art interfaces are explained later.

A queued serial peripheral interface unit (QSPI) is incorporated in many microcomputers and peripherals. The following references are useful: U.S. Pat. No. 4,958,277 [1] and 4,816,996 [2] both to Hill et al., and "Queued Serial Module (QSM) Reference Manual" by Motorola, Inc. 1991, order number QSMRM/AD [3].

The present invention seeks to provide a computer system with an improved interface and an improved method which mitigate or avoid these and other disadvantages and limitations of the prior art.

DETAILED DESCRIPTION OF A PREFERRED EMBODIMENT

The present invention is explained in connection with a QSPI, but this is not limiting. Those of skill in the art are able, based on the description herein, to apply the present invention to other interfaces without departing from the scope of the present invention.

The terms "assert", "assertion", "negate" and "negation" are used to avoid confusion when dealing with binary signals. "Assert" and "assertion" are used to indicate that a binary signal is rendered active, or logically true (e.g., logical "1"). "Negate" and "negation" are used to indicate that a signal is rendered inactive, or logically false (e.g., logical "0"). In some instances, in order to accommodate standard usage, "set" or "setting" is used in the place of "assert" or "assertion" and "clear" or "clearing" is used in the place of "negate" or "negation".

Figure 1:
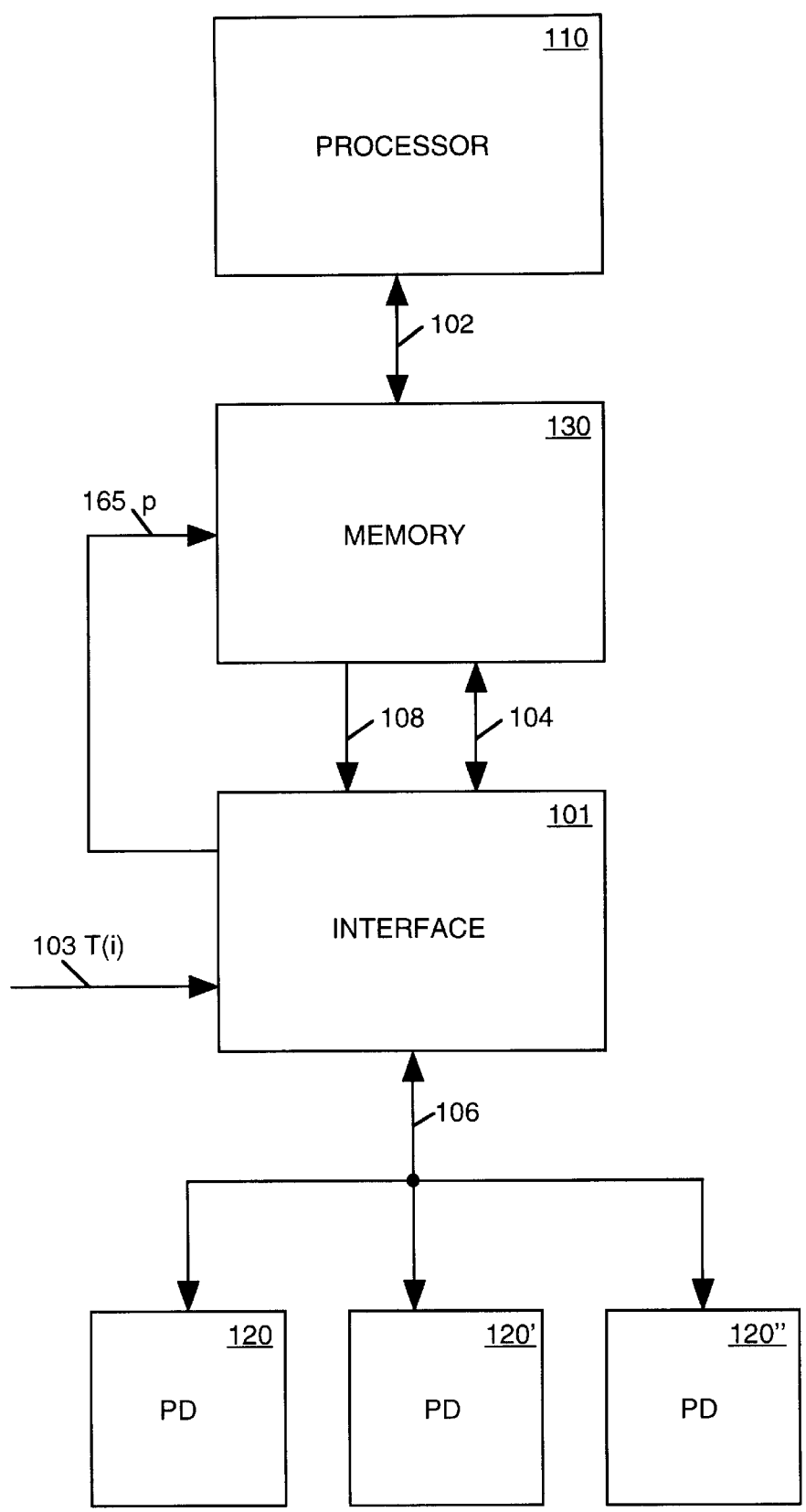
FIG. 1 is a simplified block diagram of a microcomputer system according to the present invention.

FIG. 1 is a simplified block diagram of computer system 100 (hereinafter system 100) according to the present invention. System 100 comprises processor 110, memory 130, data interface 101 (hereinafter interface 101 ) and one or more peripheral devices 120, 120', 120", etc. (collectively peripheral device 120). Processor 110 is coupled to memory 130 via bi-directional data path 102; memory 130 is coupled to interface 101 via bi-directional data path 104 and via control path 108; and interface 101 is coupled to peripheral devices 120, 120', 120"via path 106. Arrows at paths 102, 104, 108, and 106 illustrate a preferred signal flow. The above noted paths can be busses or single lines according to the needs of the user. Pointer 165 ("pointer p") of interface 101 goes to memory 130. As indicated by line 103, interface 101 receives trigger signals T(i), hereinafter also "triggers". It is well known in the art how to provide trigger signals T(i) by, for example, processor 110, by a timer, or by a trigger generator. Interface 101 receives data from memory 130 and sends data to peripheral devices 120, 120', 120"or, vice versa, interface 101 receives data from peripheral devices 120 and writes data into memory 130.

Figure 2:
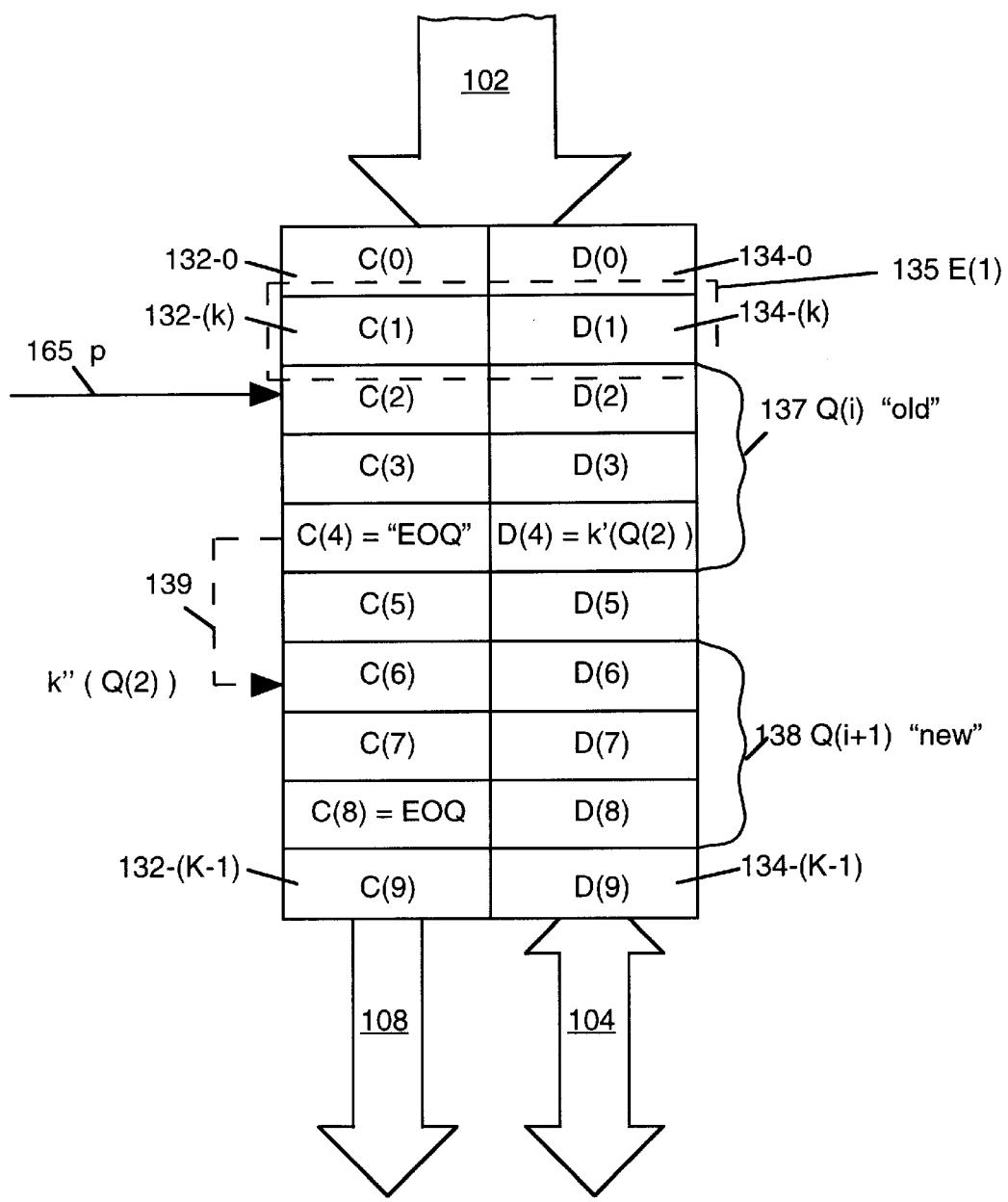
FIG. 2 is a simplified block diagram of a memory which is part of the system of FIG. 1.

FIG. 2 is a simplified block diagram of memory 130 which is part of system 100 (FIG. 1). Memory 130 has K fields 132-k (k=0 to (K-1)) and K fields 134-k (k=0 to (K-1)) ("memory locations"). Pointer 165 (cf. FIG. 1, hereinafter pointer p) points to fields 132-k and to fields 134-k which have k=p. In the example of FIG. 2, pointer p=2 points to fields 132-2 and 134-2. For simplicity of explanation, indices k are considered as addresses for fields 132-k and 134-k. Field 132-k stores control word C(k) and field 134-k stores data word D(k). Control word C(k) and data word D(k) are collectively referred to as entry E(k). For example, entry E(1) is illustrated by dashed frame 135.

Consecutive entries E(k') to E(k") in memory 130 form a data queue (hereinafter queue Q(i)). Preferably, single-primed index k' illustrates the start of a queue Q(i) and double-primed index k" illustrates the end of queue Q(i). Indices i and i+1 distinguish queues Q(i) and Q(i+1) with different entries. Queues can overlap and share entries, but this is not essential. In the example of FIG. 2, which is not intended to be limiting, memory 130 has each K=10 memory fields 132-k and 134-k and stores entries E(0) to E(9). Queue Q(i) (reference number 137) comprises entries E(2), E(3) and E(4) (k'=2, k"=4); and queue Q(i+1) (reference number 138) comprises entries E(6), E(7) and E(8) (k'=6, k"=8). For explanation, queues Q(i) and Q(i+1) should be transmitted consecutively. For convenience, queue Q(i) is sometimes noted as "old queue" and Q(i+1) is noted as "new queue".

In the example of FIG. 2, dashed line 139 symbolizes a jump from the end of old queue Q(i) (entry E(4) with C(4) and D(4)) to the start of new queue Q(i+1) (entry E(6) with C(6) and D(6)). Control word C(4) (k"=4) of old queue Q(i) stored in field 132-4 can comprise the information EOQ ("End Of Queue") and data word D(4) can comprise the start index k' of the new queue Q(i+1). Data word D(4) can have other information which can either be transmitted or not transmitted. Those of skill in the art are able, based on the description herein to provide means to make this decision. Similarly, control word C(8) in field 132-8 can also comprise EOQ. Similarly, data word D(8) can have other information to be transmitted or not transmitted.

Preferably, bi-directional data path 102 carries control words C(k) and data words D(k) between processor 101 and memory 130 (cf. FIG. 1); bi-directional data path 104 carries data words D(k) between interface 101 and memory 130 (cf. FIG. 1); and one-directional control path 108 carries control words C(k) from memory 130 to interface 101.

In the following, features (a), (b), and (c) of the present invention are compared to the prior art. (a) Referring to QSPI 20 in FIGS. 3 of prior art references [1] and [2], queue pointer 56 ("pointer p") moves between a value of NEWQP ("start index k'") and ENDQP ("end index k''"). Queue pointer 56 is controlled by a central processing unit (CPU). In a comparing step, comparator 61 periodically checks whether a queue has reached its end or not. ENDQP or the length of a queue needs to be communicated to QSPI 20 prior to transferring a queue.

The present invention solves this problem by storing the queue end information in the queue itself. Preferably, EOQ is stored in the last entry E(k'') of the queue. EOQ is, preferably, coded within the control word C(p) of E(p) (p=k'') by a single bit or by a combination of multiple bits. EOQ can also be expressed in the data word D(p).

(b) In prior art QSPI 20, the start and end for old queue Q(i) and for new queue ("Q(i+1)") is defined by NEWQP and ENDQP values. Interconnections between queues are not possible. According to the present invention, it is possible to jump from a completed old queue Q(i) to a new queue Q(i+1). The old queue Q(i) stores the start index k'(Q(i+1)) of the new queue Q(i+1). Preferably, the start index is stored in the data word D(k'') of the last entry E(k'') of the old queue Q(i). An important advantage of this feature is an enhanced flexibility of system 100 to handle queue sequences. There is no need for a memory field to store ENDQP. Also, re-programming of ENDQP is no longer required. Instead, jump routines can be programmed easier. This saves software development time.

It is possible to repeat the execution of queues in a wrap-around mode. In such cases, the last entry of a queue Q(i) points back to its start index (e.g., to k').

(c) Trigger signals T(i) can be used to start a queue transfer. However, there are instances where one queue Q(i) is transferred in repetitions. For periodical transitions with substantially equal time intervals between each repetition, queues transfers can be initiated by a periodical trigger signal sequence from, e.g., a trigger generator. There are instances, where the repetitions are not equidistant in time. It is well known in the art to program a trigger generator (or timer) which provides the necessary trigger sequences. However, to use a programmable trigger generator can be inconvenient due to additional hardware and software expenses.

According to the present invention, queues stored in memory 130 can comprise ignore instructions for interface 101. Conveniently, processor 150 writes ignore instructions as so-called NoOp instructions (for "No Operation") to any entry E(k) (k'≦k≦k'') of any queue Q(i). This feature results in the following advantages of the present invention over the prior art: The interface may disregard unwanted trigger signals. The trigger generator can be simplified. A simplified trigger generator may require less communication with processor 110 so that processor resources are saved. Compared to the prior art, the number of interactions between processor 110 and interface 101 can be reduced. Processor 110 gets more time which can be used for other applications.

Figure 3:
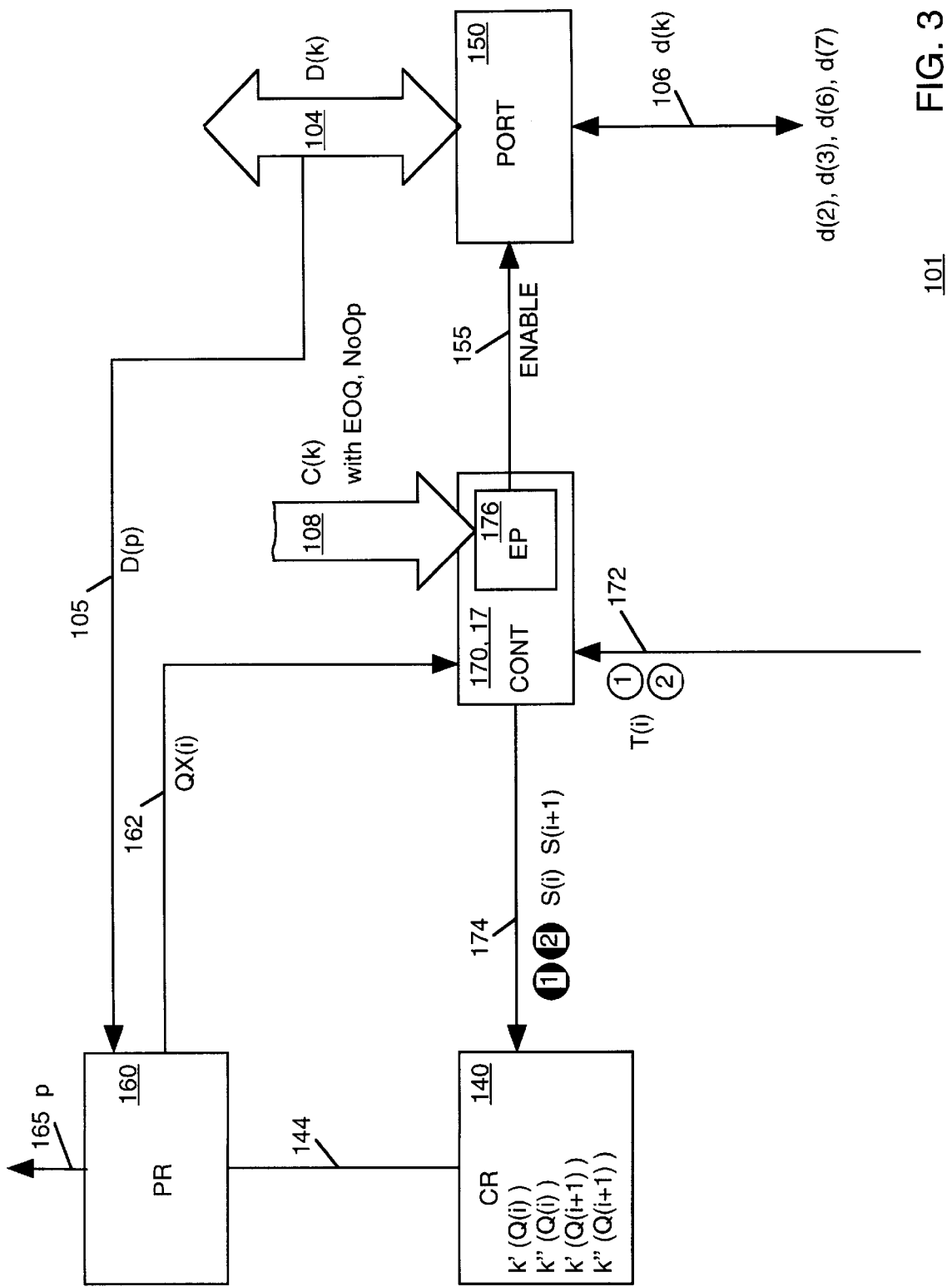
FIG. 3 is a simplified block diagram of an interface which is part of the system of FIG. 1.

FIG. 3 is a simplified block diagram of interface 101 which is part of system 100 (FIG. 1). Interface 101 comprises pointer register (PR) 160, control register (CR) 140, controller (CONT) 170 with enable portion (EP) 176, and port 150. Port 150 exchanges data words D(k) with memory 130 via bi-directional path 104 and exchanges data words d(k) with peripheral device 120 (cf. FIG. 1) via bi-directional data communication path 106 (hereinafter path 106). The information of data words D(k) and d(k) remains substantially the same, while the form can change. For example, port 150 can be implemented as a data serializer. A data serializer is described in details in connection with FIGS. 3 of references [1] and [2]. In such a case, data words D(k) would be parallel bits and data words d(k) would be serial bit sequences, but this is not important for the present invention.

Port 150 receives control signals from controller 170 via line 155, but these signals are not essential for the present invention. Interface 101 of the present invention has line 105 coupled between bi-directional data path 104 and pointer register 160. Line 105 carries new pointer p to pointer register 160. Persons of skill in the art are able to equip line 105 with, for example, logic elements needed to implement the method of the present invention described below. In FIG. 3, control register 140 optionally stores start index k'(Q(i)) and end index k''(Q(i)) of old queue Q(i) as well as start index k'(Q(i+1)) and end index k''(Q(i+1)) of new queue Q(i+1). For example, port 150 sends data words d(2), d(3), d(6), and d(7) to peripheral device 120 via communication line 106.

Conveniently, control register 140, stores start index k'(Q(i)) of each queue Q(i). Optionally, control register 140 can also store an end index k''(Q(i)). But this is not essential for the present invention. Start and end indices can also be stored in control and data words. Control register 140 is coupled to pointer register 160 via line 144 to communicate k'(Q(i)) and k''(Q(i)) (optionally). Pointer register 160 generates pointer p (165) advancing between k' and k''. Pointer p is a movable pointer which successively points to entries E(k') to E(k'') of queue Q(i). It is well known in the art to generate such a pointer p. See, for example, references [1] and [2]. The combination of control register 140 and pointer register 160 given here in FIG. 3 is therefore only an example.

According to the present invention, controller 170 provides a start signal S(i) to control register 140 via line 174 and receives an end signal QX(i) from pointer register 160 via bus 162. S(i) is illustrated by symbols ● (e.g., S(i) for queue Q(i)) and ● (e.g., S(i+1) for Q(i+1)). After receiving S(i), pointer register 160 moves pointer p and port 150 transfers data words D(k) of queue Q(i) between memory 130 and peripheral device 120. Then, pointer register 160 tells controller through QX(i) on bus 162 that queue Q(i) has finished. Preferably, pointer register 160 will not accept a new S(i+1) while a queue is being transmitted.

Optionally, controller 170 receives control words C(k) from memory 130 via path 108. Control words C(k) are used to control enable portion 176, to define parameters for path 106 and for other purposes. Controller 170 receives trigger signals T(i) at line 172. Line 172 can be a bus with e.g., a number of I partial lines for each queue Q(i), or trigger signals T(i) can be provided via a single line. In the following text and figures, trigger signals T(i) are illustrated by symbols ① (trigger signal T(i) for Q(i)) and ② (trigger signal T(i+1) for Q(i+1)). Trigger signals T(i) and T(i+1) can be considered as tokens. In the example of FIG. 3, trigger signals T(i) arrive in the order ① ②. Trigger signals T(i) (e.g. ①), start signals S(i) (e.g.,●) and end signals QX(i) are preferably, binary signals which are asserted only for a short time to invoke actions and which reset automatically.

Figure 4:
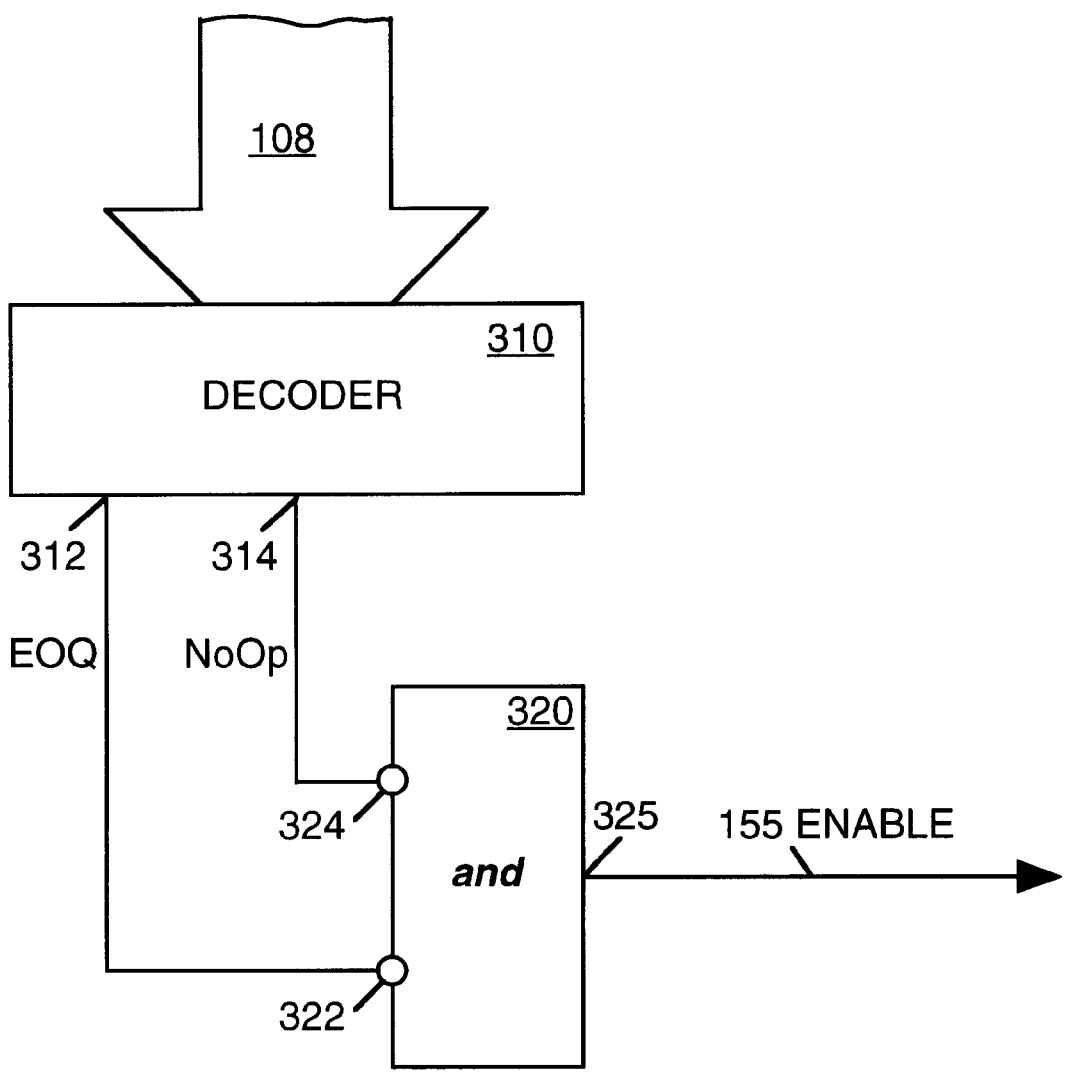
FIG. 4 is a simplified block diagram of an enable portion of the interface of FIG. 3 according to the present invention.

FIG. 4 is a simplified block diagram of enable portion (EP) 176 of the interface 101 of FIG. 3 according to the present invention. Enable portion 176 comprises decoder 310 coupled to and-gate 320. Decoder 310 receives control words C(k) from memory 130 via control path 108 (cf. FIGS. 2–3) and retrieves signals EOQ and NoOp as binary signals (logical "1" or "0" values) from other control information stored in C(k). Signals EOQ and NoOp are available on outputs 312 and 314, respectively, of decoder 310. Outputs 312 and 314 are coupled to inverting inputs 322 and 324 (circle symbols for inversion), respectively, of and-gate 320. And-gate 320 has output 325 coupled to port 150 via line 155. And-gate 320 provides binary port enable signal ENABLE according to:

ENABLE=EOQ and NoOp, (1)

wherein the underscoring stands for logical inversion and "and" stands for logical conjunctive operation. In other words, port 150 transfers data words D(k) to d(k) when queue Q(i) has not yet reached its end and control word C(k) allows a data transfer. A person of skill in the art is able, based on the description herein, to implement enable portion 176 in a different way without departing from the scope of the invention. When optionally one or more of the above mentioned features (a), (b) are (c) are not used, then and-gate 320 can be reduced to, for example, a simple inverter gate.

Figure 5:
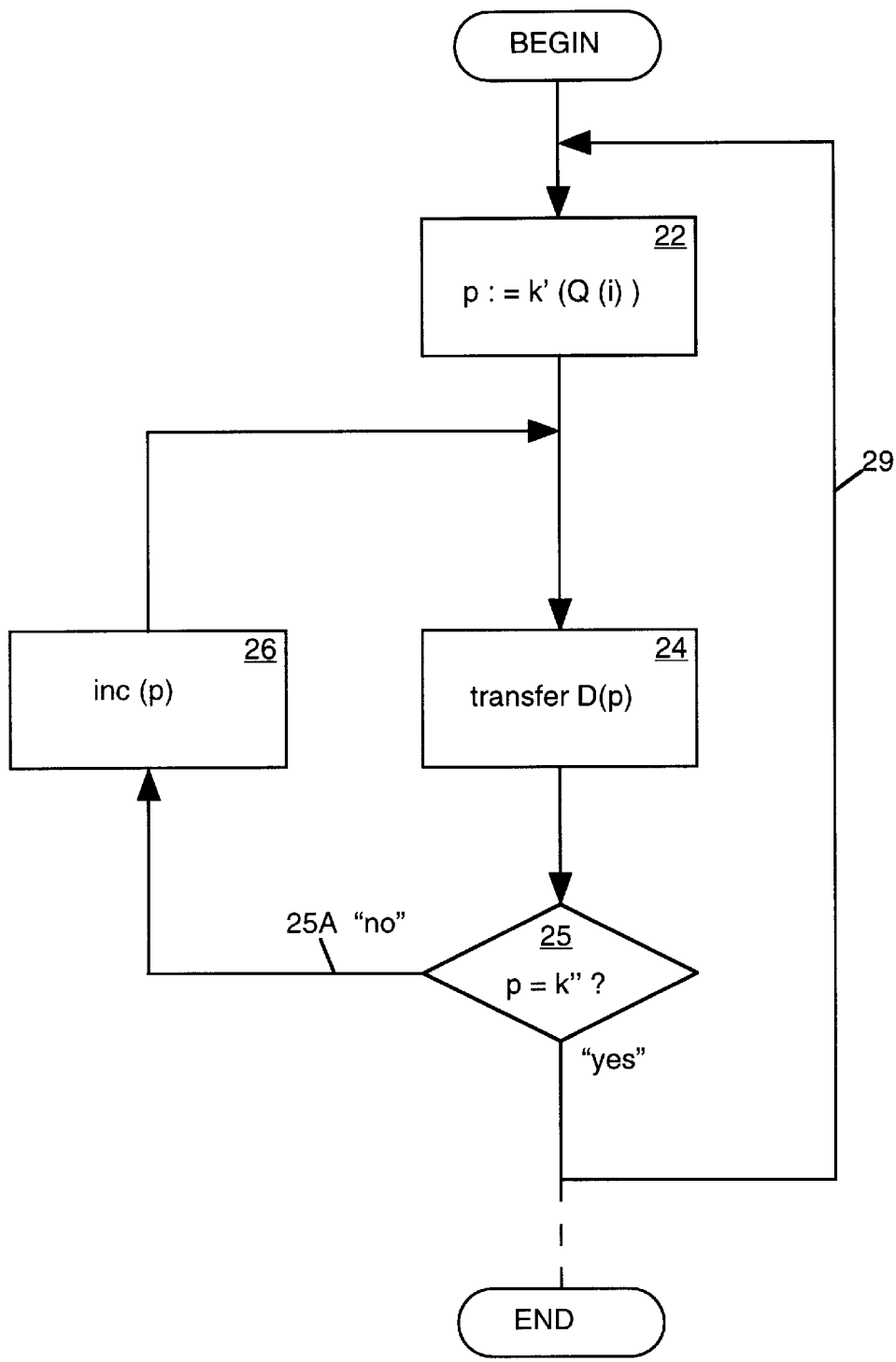
FIG. 5 is a simplified flow chart diagram of a prior art method.
Figure 6:
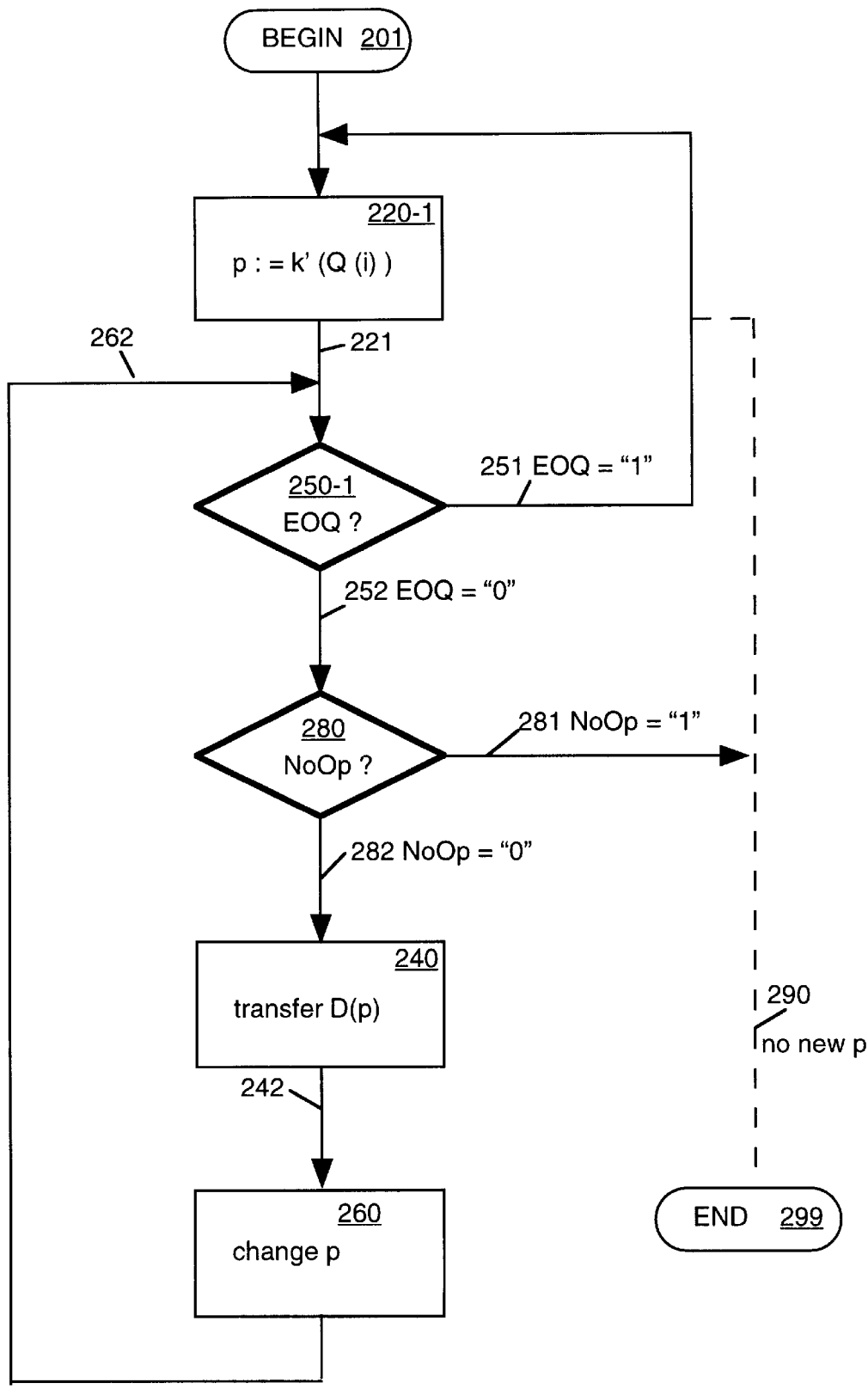
FIGS. 6–9 are a simplified flow chart diagrams of methods according to the present invention.
Figure 7:
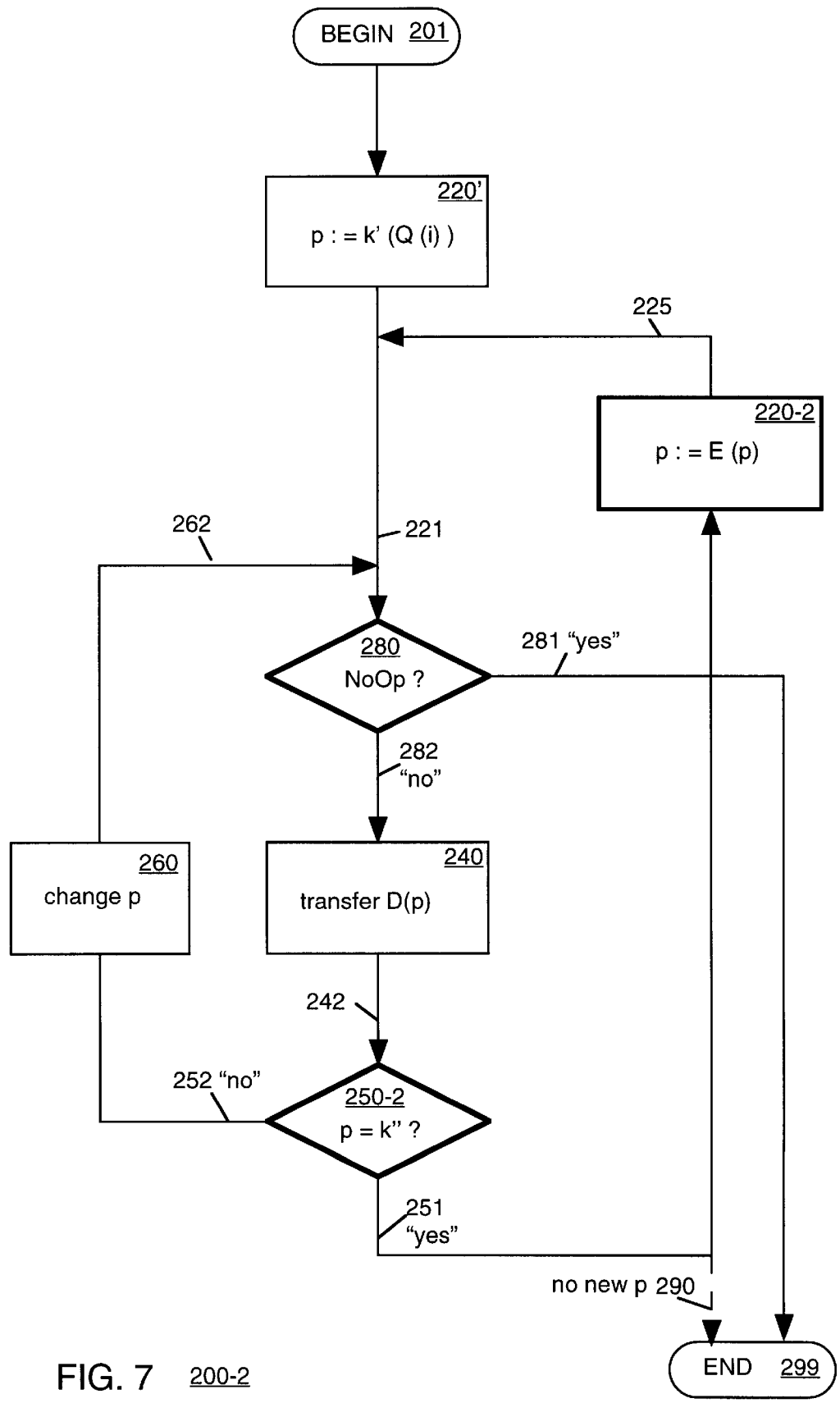

FIG. 5 is a simplified flow chart diagram of a prior art method 20. Method 20 comprises determining pointer step 22, transferring step 24, query step 25, and incrementing pointer step 26. The steps are illustrated by blocks. Arrows 25A and 29 between the blocks illustrate a preferred method flow. Prior art method 20 can also be performed by system 100 of the present invention, but this is not essential.

FIGS. 6–9 are a simplified flow chart diagrams of methods 200-m (m=1 to 4) according to the present invention. Methods 200-m are, preferably, applied on system 100 of the present invention. Those of skill in the art are able, based on the description herein, to apply methods 200-m to other system, such as, for example, to general purpose computers. Method 200-m comprises step 220-m for assigning pointer p (labeled "p:=k'(Q(i))" or "p:=E (p)"), optional step 220' for pointer assigning pointer p ("p:=k'(Q(i))"), optional query step 280 ("NoOp?"), transferring step 240 ("transfer D(p)"), queue end query step 250-m ("EOQ?", "p=k"?", or "{p=k" or EOQ}?"), and step 260 for changing pointer p. Methods 200-m should start at block 201 (labeled "BEGIN") and end at block 299 ("END"). Steps required to start a queue transmission (e.g., by trigger signals) are explained, for example, in reference [1]. Arrows 221, 225, 242, 251, 252, 262, 281, 282, and 290 in FIGS. 7-9 indicate preferred method flows.

Figure 8:
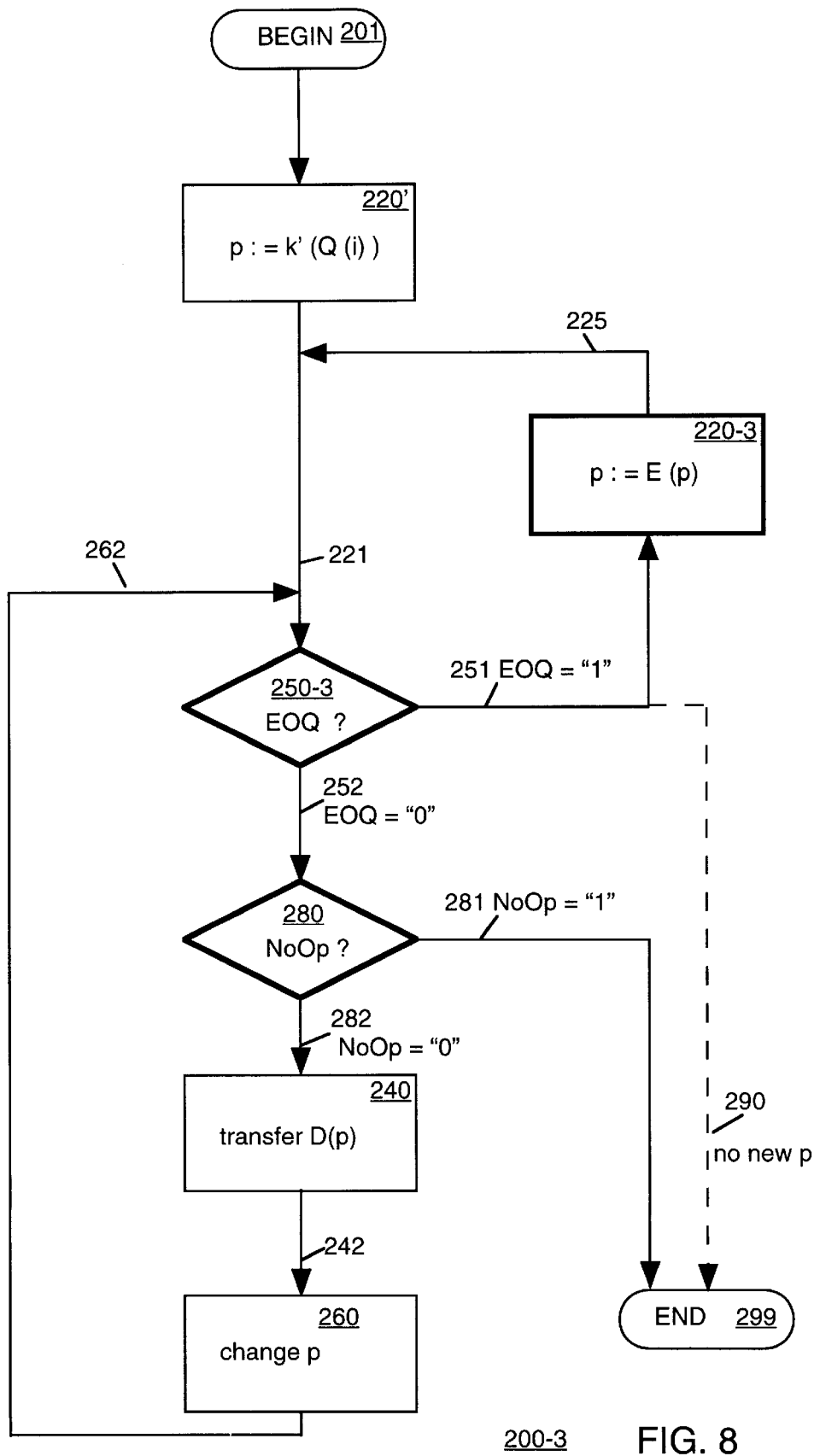
Figure 9:
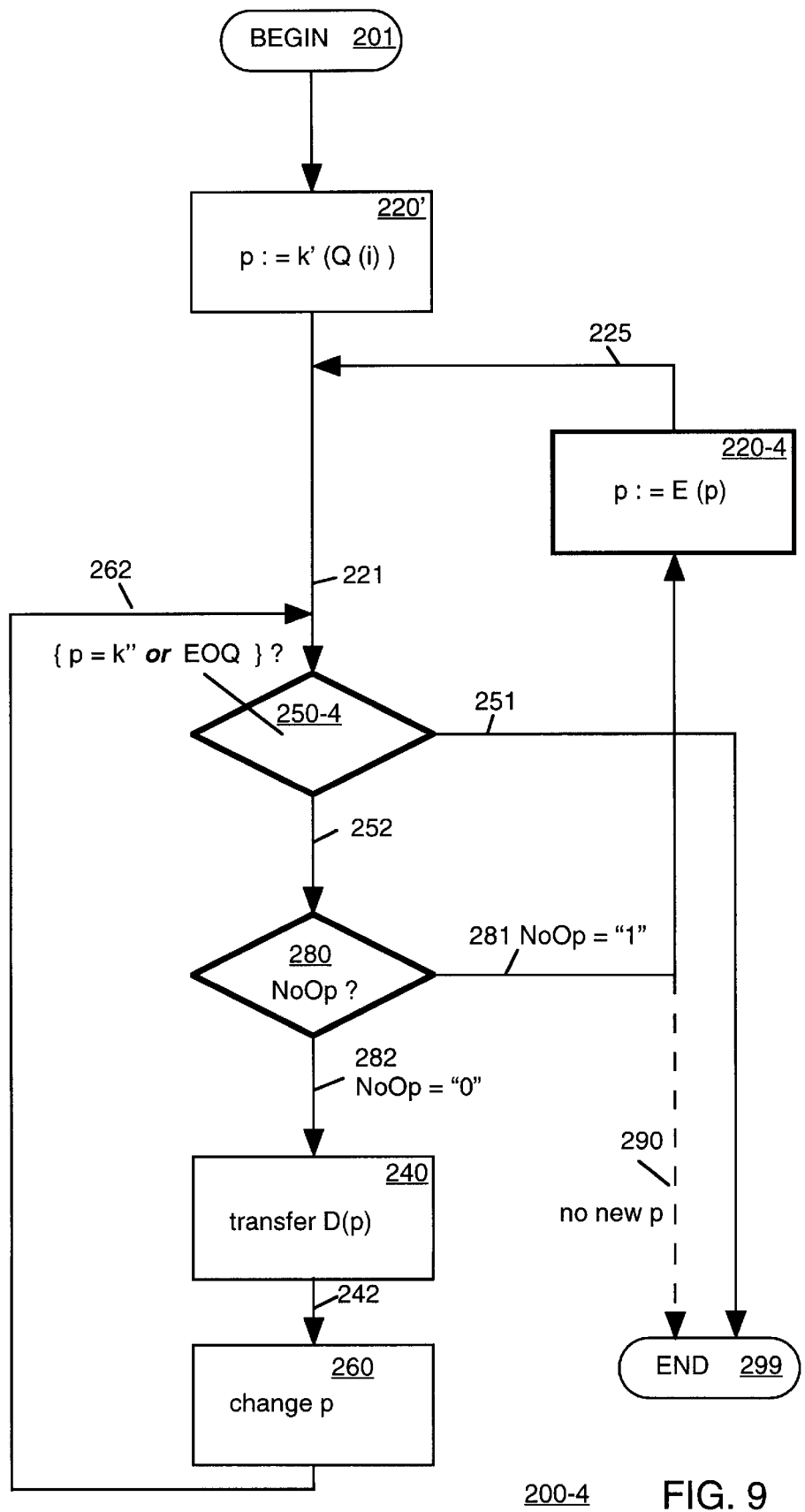

Method 200-3 of FIG. 8 is explained as an representative example for methods 200-m. Method 200-3 starts at BEGIN block 201.

(a) In step 220', pointer p is assigned to start index k'(Q(i)) of queue Q(i). Pointer p (cf. reference number 165 in FIG. 3) points to a first entry E(p) of queue Q(i). Entry E(p) has data word D(p), signal EOQ at either logical "1" or logical "0" and signal NoOp at either logical "1" or logical "0".

(b) Illustrated by arrows 221 and 252, the next steps are queue end query step 250-3 and query step 280. Steps 250-3 and 280 can be performed in either order or can be performed simultaneously. In steps 250-3 and 280, enable portion 176 of controller 170 reads EOQ and NoOp from entry E(p).

(c) The next steps are performed depending on EOQ and NoOp. (c1) For EOQ="0" and NoOp="0" (cf. condition (1)) enable portion 176 asserts ENABLE and port 150 transfers data word D(p) to communication path 106. The flow diagram of FIG. 8 shows arrow 252 (EOQ="0") from query step 250-3 to query step 280 and arrow 282 (NoOp="0") from query step 280 to transferring step 240. (c2) For EOQ="1", queue Q(i) has reached its end. A new pointer p is assigned for queue Q(i+1) in step 220-3. It is an advantage of the present invention, that the new pointer p is obtained from the entry E(p) of the old queue (p:=E(p), step 220-3 ). New pointer p is preferably, obtained from data word D(p). Pointer p is now the start index k' of Q(i+1) and points to the first entry E(k')=E(p) of Q(i+1). Method 200-3 continues with (a). (c3) For NoOp="1", method 200-3 is aborted (arrow 281 to end block 299) without the start of a new queue Q(i+1).

(d) Indicated by arrow 242, transferring step 240 is followed by step 260. Pointer p is, preferably, incremented by one. Method 200-3 is continued with a repetition of (a), (b), (c) to (d) for further entries E(p).

Dashed arrow 290 going to end block 299 indicates that method 200-3 can optionally be aborted for EOQ="1" (arrow 251 at query step 250-3) when the last entry E(p) of queue Q(i) does not provide a new pointer p.

In other words, methods 200-m of the present invention can be described as a method for exchanging data queues (e.g., Q(i), Q(i+1)) between a memory (e.g., memory 130) and a data communication line (e.g., line 106) which has steps as follows:

Consecutively (e.g., for incrementing pointer p) exchanging entries E(p) of queue Q(i) until last entry E(k") of queue Q(i) identifies the end of Q(i); and consecutively exchanging entries E(p) of queue Q(i+1) which is identified by pointer p which is stored in the last entry E(k") of queue Q(i).

Table 1 provides a convenient comparison between prior art method 20 and methods 200-m of the present invention. Method reference numbers are given horizontally in columns (1) on the left side. Columns (2) and (3) distinguish possible pointer assigning steps (e.g., 220-m) at the queue start; and columns (4) and (5) distinguish possible query steps (e.g., 250-m and 25, question marks?) at the queue end. The term "used" in columns (2) to (5) indicates the use of this possibility. In column (2), the abbreviation "p:=k'" means that pointer p is initially set to the start index k' stored in control register 140. In column (3), "p:=E(p) " symbolizes that the pointer p for a new queue Q(i+1) is stored in the last entry E(p) of the old (previous) queue Q(i). Optionally, E(p) can store other information. Preferably, pointer p is stored within data word D(p), but pointer p can also be stored in control word C(p). In column (4), "p=k"?" indicates that pointer register 160 compares the pointer p with the end index k". In column (5), "EOQ?" indicates that the EOQ is checked.

TABLE 1

Comparison between prior art method 22 to methods 200-m (m = 1–4) of the present invention

| methods | queue start (assign steps 220-m, 22) | | queue end (query steps 250-m, 25) | |
|---|---|---|---|---|
| | p : = k' | p : = E (p) | p : = k"? | EOQ? |
| 20[1] (FIG. 5) | used | | used | |
| 200-1 (FIG. 6) | used | | | used |
| 200-2 (FIG. 7) | | used | used | |
| 200-3 (FIG. 8) | | used | | used |
| 200-4 (FIG. 9) | | used | used | used |
| (1) | (2) | (3) | (4) | (5) |

[1]prior art method

Figure 10:
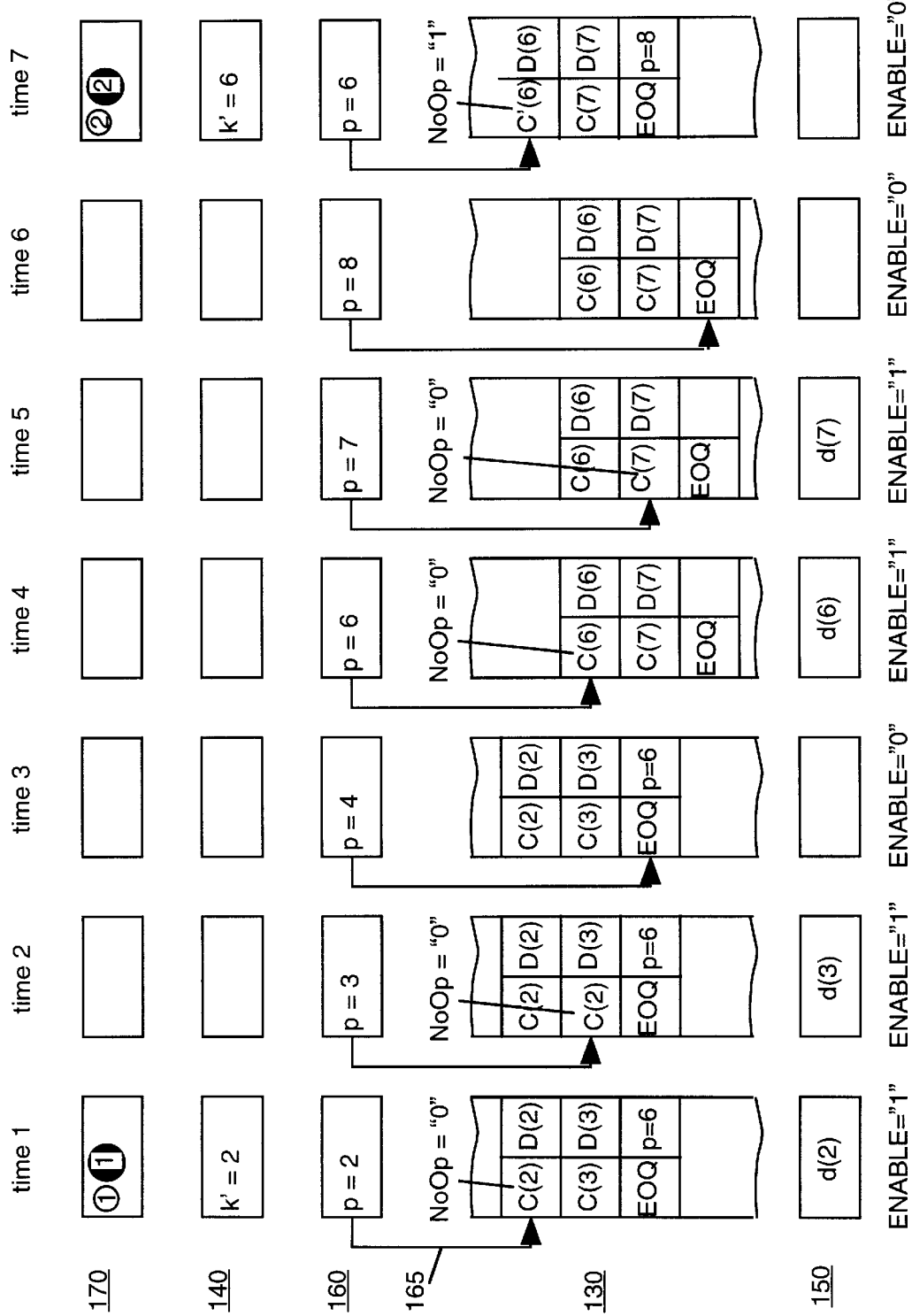
FIG. 10 illustrates the method of FIG. 8 by simplified time-slices of the components of the system of FIG. 1.

FIG. 10 illustrates method 200-3 by simplified time-slices of components (e.g., 170, 140, 160, 130, 150) of system 100. In FIG. 10, the time, identified by "time 1" to "time 7" progresses in columns from the left to the right. The columns illustrate time slices of controller 170, control register 140 (cf. FIG. 3), pointer register 160 (cf. FIG. 3), memory 130 (FIG. 1), and port 150 (cf. FIG. 3). For convenience, line 165 (cf. FIGS. 1 and 3) symbolizes how pointer p addresses memory 130. For simplicity, FIG. 10 shows memory 130 with only some of its memory fields. For some time slices, texts "NoOp="0"" and "NoOp="1"" having lines to control words C(p) indicate that these control words C(p) comprise the NoOp signal. Where the NoOp-text is left out, the NoOp signal is not important. Similarly, FIG. 10 also gives the ENABLE signal. Other connections between the components are already explained above and are therefore not illustrated. At time 1, controller 170 receives trigger signal T(i) (e.g., ①) and provides start signal S(i) (e.g.,●) for old queue Q(i) (cf. reference number 137 in FIG. 2). Control register 140 supplies start index k'=2 of Q(i) to pointer register 160. Pointer p (165) becomes p=k'=2 (step 220' in FIG. 8). The operation of controller 170 and registers 140 and 160 is not important for the present invention and can be performed, for example, according to reference [1]. Control word C(2) has NoOp="0" and EOQ="0", so that controller 170 enables (ENABLE="1") port 150, which, preferably, transfers data word D(2) as data word d(2) to communication line 106. Method steps are 280, 250-3 and 240. At one of the following times, processor 110 (cf. FIG. 1) will modify control word C(2) and write NoOp="1" into C(2). Details are given at time 7.

At time 2, register pointer 160 increments pointer p to p=3 (step 260). After having checked NoOp and EOQ (steps 280 and 250-3), controller 170 enables port 150. Port 150 transfers D(3) to d(3) (step 240).

At time 3, register pointer 160 increments pointer p to p=4 (step 260). Controller 170 finds the EOQ="1" information in C(4). The first queue Q(i) has been transmitted completely. Preferably, controller 170 disables port 150 (ENABLE="0", equation (1)) so that no data words are transferred. According to step 220-3, line 105 supplies the new pointer p=6 to for the new queue Q(i+1) to pointer register 160. New pointer p=6 is the new start index.

An important advantage of the present invention becomes evident at the transition between time 3 and time 4. An end index (e.g., k") for the old queue Q(i) is not required. Also, control register 140 does not need to store a start index (e.g., k') for the new queue Q(i+1).

At times 4 and 5, with NoOp="0" and EOQ="0", port 150 transfers data word D(6) as d(6) and D(7) as d(7) to communication line 106. It is possible to start the transfer of the new queue by a trigger signal. But this is not important for the present invention and therefore not illustrated.

At time 6, pointer p=6 reaches the end of queue Q(i+1) which is according to the present invention identified by EOQ="1" in the last entry E(p) (here in C(8)). Preferably, port 150 does not transfer data. Data word D(8) does not comprise a start pointer for a further queue. This is illustrated by an empty field (e.g., field 134-8) in memory 130. Method 200-3 comes to end 299 at dashed arrow 290 (FIG. 8).

At time 7, controller 170 receives trigger signal T(i) (e.g., ②) and provides start signal S(i+1) (e.g., ●) for queue Q(i+1) (cf. reference number 138 in FIG. 2). Control register 140 supplies start index k'=6 of Q(i+1) to pointer register 160. Pointer p (165) becomes p=k'=6 (step 220' in FIG. 8). Until here, system 100 operates similar as during time 1. Now, an advantage of the present invention can be seen at the modified control word C'(6) having a prime marker. NoOp="0" forces system 100 to abort method 200-3 (arrow 290). Port 150 does not transmit data, although a trigger signal has arrived. In other words, a trigger generator can be simplified because efforts to schedule the queue transfer are shifted to processor 110.

It should be mentioned that according to the simplified method flow diagram of FIG. 8, system 100 can continue to operate with step 220-3 and start a further queue if D(2) comprises a new pointer. But this is neglected here for convenience and simplicity of explanation.

A preferred operation of system 100 has been described for method 200-3 by a simplified example. A person of skill in the art is now able to practice the present invention in similar implementations using, for example, methods 200-1, 200-2, and 200-4.

Various modification can be applied to system 100 and to methods 200-m without departing from the invention. For example, during software and hardware testing, it can be an advantage to transmit all queues stored in memory 130 consecutively without a break. Entries E(k) in memory 130 are program instructions which could be transferred to a peripheral device under test. Such instructions should, preferably, not be changed for the purpose of testing. When NoOp="0" or EOQ="0" then a data transmission according to method 200-m could terminate. Under testing conditions, a trigger generator might not yet be coupled to system 100.

The use of a simple trigger to initiate all queues is a possibility. A simple trigger can be obtained from a testing device which supplies the single trigger independently from the software. As illustrated in connection with FIG. 10, a single trigger ① invokes the transfer of queues Q(i) and Q(i+1). Old queue Q(i) is finished at time 3 with EOQ="1". The next queue starts because data word D(6) stores p=6 for new queue Q(i+1).

It is also possible to neglect EOQ and NoOp for testing and have ENABLE permanently as ENABLE="1". This can be accomplished, for example, by an additional or-gate in enable portion 176. ENABLE would become ENABLE={EOQ and NoOp} or CTE     (2)

with signal CTE for "Continuous Transfer Enable". Such a signal CTE could also be supplied to control register 140.

A person of skill in the art is also able to implement a priority system and have signals EOQ and NoOp with different priority for different queues.

While the invention has been described in terms of particular structures, devices and methods, those of skill in the art will understand based on the description herein that it is not limited merely to such examples and that the full scope of the invention is properly determined by the claims that follow.

What is claimed is:

1. A computer system with an interface between a memory and a communication path, said interface comprising:
   a pointer register with a movable pointer pointing to entries in said memory, said entries having a control word and a data word, pluralities of consecutive entries forming queues each having a first entry and a last entry;
   a port coupled between said memory and said communication path for consecutively transmitting said data words of the entries pointed to by said pointer from said memory to said communication path or vice versa by said queues; and
   a controller consecutively receiving said control words and selectively enabling or disabling said port to transmit data words according to said control words received from said memory.

2. The computer system of claim 1 wherein said control words comprise ignore instructions.

3. The computer system of claim 1 wherein the control word of said last entry comprises an end-of-queue signal to disable said port.

4. The computer system of claim 1 wherein
   (i) said control word of said last entry of an old queue comprise an end-of-queue signal; and
   (ii) said pointer register is coupled to said memory for receiving a new pointer stored in some of said data words for a new queue.

5. The computer system of claim 1 wherein a bi-directional data path transfers said data words between said memory and said port and wherein a one-directional control path sends control words to said controller.

6. The computer system of claim 1 wherein said controller comprises an enable portion which for every entry retrieves (i) an end-queue-signal (EOQ) and (ii) port disable signal (NoOp) from said control word and provides an enable signal ENABLE for said port according to: ENABLE=EOQ and NoOp.

7. A method for transferring queues from a memory to a communication path through a port or vice versa, said method comprising the steps of:
   (a) pointing with a pointer p to a first entry of a first queue, said first entry having
      (1) a first data word,
      (2) a signal EOQ which is either "1" or "0", and
      (3) a signal NoOp which is either "1" or "0";
   (b) reading EOQ and NoOp from said first entry by a controller;
   (c) depending on EOQ and NoOp:
      (c1) for EOQ="0" and NoOp="0" sending an enable signal from said controller to said port to enable the transfer of said data word to said communication path,
      (c2) for EOQ="1" repeating step (a) with a new pointer p to a second entry of a second queue, said new pointer p being stored in said first entry,
      (c3) for NoOp="1" aborting said method;
   (d) changing said pointer p; and
   (e) repeating said steps (a), (b), (c) and (d) for further entries.

8. The method of claim 7 wherein in said step (d) said pointer p is incremented.

9. The method of claim 7 wherein in said step (c2) said new pointer p is stored in said first data word.

10. A computer system with a memory coupled to a communication path through an interface, said memory storing entries wherein each entry has a control word and a data word, said interface comprising:
    a pointer register for moving a pointer within a plurality of entries in said memory;
    a port coupled between said memory and said communication path for consecutively transmitting the data word of the entry currently pointed to by said pointer from said memory to said communication path or vice versa; and
    a controller coupled to said memory for receiving the control word of the entry currently pointed to by said pointer and for selectively enabling or disabling said port according to said control word.

* * * * *